Patented Aug. 29, 1939

2,171,159

UNITED STATES PATENT OFFICE 2,171,159

AZO COMPOUNDS AND PROCESS FOR COLORING THEREWITH

James G. McNally, Joseph B. Dickey, and Werner H. Zugschwerdt, Rochester, N. Y., assignors to Eastman Kodak Company, Rochester, N. Y., a corporation of New Jersey No Drawing. Application March 17, 1938, Serial No. 196,480

18 Claims. (Cl. 8—50)

This invention relates to azo dye compounds containing a heterocyclic keto group directly attached to a phenyl nucleus which is joined directly to an azo group and the application of the nuclear non-sulfonated compounds of the invention for the dyeing or coloring of organic derivatives of cellulose.

Organic derivatives of cellulose are characterized by an indifferent affinity for the usual cotton or wool dyes, especially the ordinary water-soluble dyes. Because of the generally indifferent affinity of organic derivatives of cellulose for dyes employed for the dyeing of other textile materials, it has been necessary to develop new dyes suitable for their dyeing or coloration. It is, accordingly, an object of our invention to provide a new class of azo dyes suitable for the dyeing of organic derivatives of cellulose.

A particular object of our invention is to provide azo dyes which may be applied directly from an aqueous medium to organic derivatives of cellulose.

A further object is to provide a process for the dyeing of organic derivatives of cellulose.

A still further object is to provide dyed textile materials made of or containing an organic derivative of cellulose which are of good fastness to light.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The azo dyes of our invention by which or through which the above objects can be accomplished have the probable general formula:

wherein R represents a heterocyclic nucleus, R₁ represents a member selected from the group consisting of a benzene nucleus, a naphthalene nucleus, a heterocyclic nucleus and a hydroaromatic nucleus and wherein the nucleus designated I may be substituted. The phenyl nucleus designated I may be substituted, for example, with an alkyl group, an alkoxy group, a holagen atom or a nitro group. Advantageously, R₁ is an aryl nucleus of the benzene series containing but one benzene ring.

The azo dyes of our invention can be prepared by diazotizing aminophenyl ketones having the general formula:

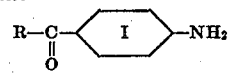

wherein R represents a heterocyclic nucleus and wherein the nucleus designated I may be substituted, for example, with an alkyl group, an alkoxy group, a halogen atom or a nitro group, and coupling with a benzene, a naphthalene, a heterocyclic or a hydroaromatic coupling component.

Advantageously, the aminophenyl ketone employed in the preparation of the azo dyes of our invention has the general formula:

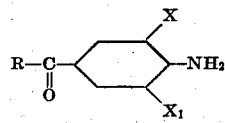

wherein R represents a heterocyclic nucleus and X and X₁ each represent a member selected from the group consisting of hydrogen, an alkyl group, an alkoxy group, a halogen atom and a nitro group.

In order that our invention may be fully understood, it should be noted that the heterocyclic nucleus R can be a furan radical such as

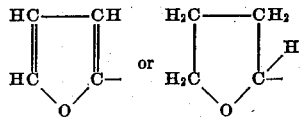

a pyrrol radical such as

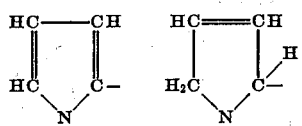

and a thiophene radical such as

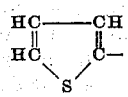

for example. The heterocyclic nucleus R may be substituted with an alkyl, an aryl, a hydroxyalkyl, an amino, an alkylamino or a hydroxyalkylamino group. Again, as shown above, the phenyl nucleus containing a heterocyclic keto group directly attached thereto contains but one benzene ring and may be substituted, for example, with an alkyl group, an alkoxy group, a halogen atom or a nitro group.

The nuclear non-sulfonated azo compounds of our invention constitute valuable dyes which may be employed for the dyeing or coloration of materials made of or containing organic derivatives of cellulose. The dyeings produced employing said nuclear non-sulfonated azo compounds are in general of good fastness to light and washing and range in shade from yellow to purplish-blue. Generally speaking, we have found that those compounds wherein R₁ is a benzene nucleus yield the best dyeings on organic derivatives of cellulose. The nuclear sulfonated compounds which may be prepared, for example, by sulfonation of the non-sulfonated azo compounds in known fashion have little or no practical utility for the coloration of organic derivatives of cellulose but may be employed to color textile materials such as wool and cotton.

The following examples illustrate the preparation of the azo compounds of our invention:

Example 1

18.7 grams of 4-aminophenylfuryl ketone are added to 200 cc. of water to which 30 cc. of 36% hydrochloric acid has been added. The resulting mixture is cooled to a temperature approximating 0–5° C. by the addition of ice, for example, and the amine diazotized by the addition, with stirring, of an aqueous solution of 6.9 grams of sodium nitrite.

14 grams of 5,5-dimethyl-1,3-cyclohexadione are dissolved in 200 cc. of water containing 31.8 grams of sodium carbonate. The resulting solution is cooled to a temperature approximating 0–10° C. and the diazo solution prepared above is added with stirring while maintaining a temperature of 0–10° C. Upon completion of the coupling reaction which takes place, the mixture is made acid to litmus by the addition of acetic or hydrochloric acid and the dye compound formed is recovered by filtration, washed with water and dried. The dye compound has the probable formula:

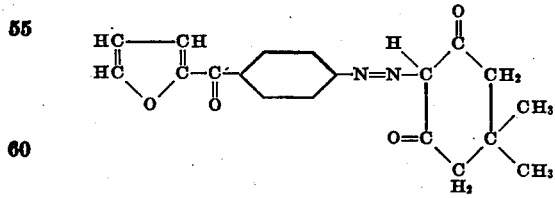

and colors cellulose acetate silk greenish yellow from an aqueous suspension.

Example 2

18.1 grams of di-β-hydroxyethylanilene are dissolved in 100 cc. of cold glacial acetic acid and the diazo solution prepared as described in Example 1 is added with stirring. The addition of the diazo solution is carried out while maintaining a temperature approximating 0–10° C. Following the addition of the diazo solution, the mixture is made neutral to Congo red paper by the addition of sodium acetate. Upon completion of the coupling reaction which takes place, the dye compound formed is precipitated by the addition of water, recovered by filtration, washed with water and dried. The dye compound has the formula:

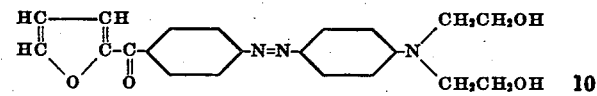

and colors cellulose acetate silk an orange shade from an aqueous suspension.

Example 3

22.2 grams of 4-amino-3-chlorophenylfuryl ketone are diazotized in the usual manner and the diazo solution is added with stirring to 16.5 grams of ethyl-β-hydroxyethylaniline dissolved in 100 cc. of cold acetic acid. This addition may be carried out while maintaining a temperature approximating 0–10° C. Following the addition of the diazo solution, the mixture is made neutral to Congo red paper by adding sodium carbonate. Upon completion of the coupling reaction which takes place, the dye compound formed is precipitated by the addition of water, recovered by filtration, washed with water and dried. It has the formula:

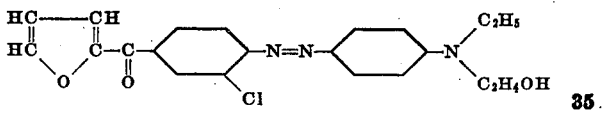

and colors cellulose acetate silk orange-red from an aqueous suspension.

Example 4

23.2 grams of 4-amino-3-nitrophenylfuryl ketone are placed in 200 cc. of water to which 30 cc. of 36% hydrochloric acid have been added. The resulting mixture is cooled to a temperature approximating 0–5° C. and diazotized by adding, with stirring, a concentrated aqueous solution of 6.9 grams of sodium nitrite.

20.7 grams of di-β-hydroxyethylaniline are dissolved in 150 cc. of cold glacial acetic acid and the diazo solution prepared as described above is added with stirring. The addition of the diazo solution may be carried out while maintaining a temperature approximating 0–10° C. The mixture is then made neutral to Congo red paper by the addition of sodium acetate. Upon completion of the coupling reaction which takes place, the dye compound formed is precipitated by the addition of water, recovered by filtration, washed with water and dried. The dye compound has the formula:

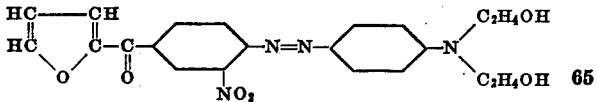

and colors cellulose acetate silk a red shade from an aqueous suspension.

While the preparation of the compounds of our invention has been illustrated in connection with aminophenylketones containing a furan nucleus directly attached to the keto group, it will be understood that aminophenylketones having a heterocyclic nucleus, other than a furan nucleus, attached directly to the keto group may be employed. 18.6 grams of

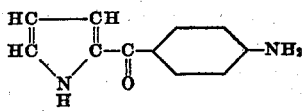

and 20.3 grams of

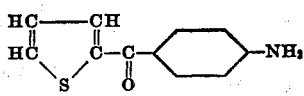

for example, can be substituted for the aminophenylketone compounds of the examples and the reactions carried out in the manner described to obtain compounds corresponding to those obtained in the examples.

In order that our invention may be fully understood, the preparation of a number of intermediate substances used in the manufacture of the azo compounds of our invention is described hereinafter.

Preparation of 4-aminophenylfuryl ketone 100 grams of 4-chlorophenylfuryl ketone, 1 liter of ammonia water (sp. g. 0.9), 1 gram of active copper powder and 1 gram of cuprous oxide are charged into an autoclave and heated at 180-200° C. for twenty hours. When the autoclave has cooled, the 4-aminophenylfuryl ketone resulting can be recovered by filtration. The product obtained may be used without further purification but it may be purified by crystallization from ethyl alcohol, for example. The purified compound melts at 218-220° C.

Preparation of p-aminophenylthienyl ketone 120 grams of p-bromophenylthienyl ketone, 1 liter of ammonia water (sp. g. 0.9), 1 gram of active copper powder and 1 gram of cuprous oxide are charged into an autoclave and heated, with shaking, at 180-200° C. for twenty hours. When cool, the reaction product is recovered by filtration and treated with hydrochloric acid, following which the acid-soluble portion is subjected to treatment with an active carbon material such as activated charcoal, for example. The p-aminophenylthienyl ketone formed by the reaction above described may be precipitated from the purified solution by addition of ammonia and recovered by filtration.

p-Bromophenylthienyl ketone employed in the above reaction may be prepared as follows:

157 grams of bromobenzene are dissolved in 500 cc. of dry carbon disulfide to which has been added 133 grams of aluminum chloride and 146 grams of

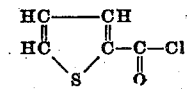

are slowly added with stirring. The reaction mixture is heated to boiling and this heating is continued until hydrogen chloride is no longer evolved. The reaction mixture is then poured onto ice and the carbon disulfide is removed therefrom by heating and steam distilling. The residue remaining is then extracted with benzene following which it is washed first with dilute hydrochloric acid and then with water. The mixture resulting from the above treatments is then distilled and a good yield of p-bromophenylthienyl ketone is obtained.

By the substitution of 160 grams of

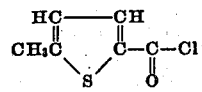

for

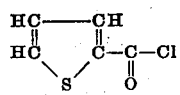

in the above reaction, p-bromophenyl-α-methylthienyl ketone,

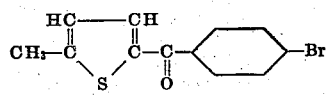

can be obtained. p-Aminophenyl-α-methylthienyl ketone may be prepared from this latter compound by the process above described in connection with p-aminophenylthienyl ketone.

Preparation of p-aminophenylpyrryl ketone 130 grams of p-bromophenylpyrryl ketone, 1 liter of ammonia water (sp. g. 0.9) 1 gram of finely divided active copper and 1 gram of cuprous oxide are charged into an autoclave and heated with agitation at a temperature of 150-195° C. for fifteen hours. When cool, the reaction product is recovered by filtration and treated with hydrochloric acid, following which the acid-soluble portion is subjected to treatment with activated charcoal. The p-aminophenylpyrryl ketone formed by the reaction may be precipitated from the purified solution by the addition of ammonia and recovered in the usual manner by filtration.

Preparation of 4-amino-3-chlorophenylfuryl ketone 130 grams of 3,4-dichlorophenylfuryl ketone, 1 liter of ammonia water (sp. g. 0.9), 1 gram of active copper powder and 1 gram of cuprous oxide are charged into an autoclave and heated with shaking at 150-200° C. for fifteen to twenty hours. When cool, the reaction product formed is recovered by filtration and treated with hydrochloric acid, following which the acid-soluble portion is subjected to a purification treatment with activated charcoal. The 4-amino-3-chlorophenylfuryl ketone, formed by the reaction above described, may be precipitated from the purified solution by the addition of ammonia and recovered by filtration.

The following tabulation further illustrates the compounds included within the scope of our invention together with the color they produce on cellulose acetate silk. The compounds indicated below may be prepared by diazotizing the amine listed under the heading "Amine" and coupling with the compounds specified in the column entitled "Coupling component." The diazotization and coupling reactions may, for example, be carried out following the general procedure described in Examples 1 to 4 inclusive. The heterocyclic amine compounds listed hereinafter contain the keto group in the α-position to the hetero N, O or S atom. (That is, the position adjacent to the hetero N, O or S atom.)

| Amine | Coupling component | Color on cellulose acetate silk |
|---|---|---|
| 4-aminophenylfurylketone | Barbituric acid | Greenish-yellow. |
| 4-amino-3-chlorophenylfurylketone | do | Do. |
| 4-amino-3-bromophenylfurylketone | do | Do. |
| 4-amino-3-nitrophenylfurylketone | do | Do. |
| 4-aminophenylfurylketone | 5,5-dimethyl-1,3-cyclohexadione | Do. |
| 4-amino-3-chlorophenylfurylketone | do | Do. |
| 4-amino-3-bromophenylfurylketone | do | Do. |
| 4-amino-3-nitrophenylfurylketone | do | Do. |
| 4-aminophenylfurylketone | Dimethylaniline | Orange. |
| 4-amino-3-chlorophenylfurylketone | do | Orange-red. |
| 4-amino-3-bromophenylfurylketone | do | Do. |
| 4-amino-3-nitrophenylfurylketone | do | Red. |
| 4-aminophenylfurylketone | Ethyl-β-hydroxyethylaniline | Orange. |
| 4-amino-3-chlorophenylfurylketone | do | Orange-red. |
| 4-amino-3-bromophenylfurylketone | do | Do. |
| 4-amino-3-nitrophenylfurylketone | do | Red. |
| 4-aminophenylfurylketone | Propyl-β-hydroxyethylaniline | Orange. |
| 4-amino-3-chlorophenylfurylketone | do | Orange-red. |
| 4-amino-3-bromophenylfurylketone | do | Do. |
| 4-amino-3-nitrophenylfurylketone | do | Red. |
| 4-aminophenylfurylketone | Butyl-β-hydroxyethylaniline | Orange. |
| 4-amino-3-chlorophenylfurylketone | do | Orange-red. |
| 4-amino-3-bromophenylfurylketone | do | Do. |
| 4-amino-3-nitrophenylfurylketone | do | Red. |
| 4-aminophenylfurylketone | Ethyl-γ-hydroxypropyl | Orange. |
| 4-amino-3-chloro-phenylfurylketone | do | Orange-red. |
| 4-amino-3-bromophenylfurylketone | do | Do. |
| 4-amino-3-nitrophenylfurylketone | do | Red. |
| 4-aminophenylfurylketone | Di-γ-hydroxypropylaniline | Orange. |
| 4-amino-3-chlorophenylfurylketone | do | Orange-red. |
| 4-amino-3-bromo-phenylfurylketone | do | Do. |
| 4-amino-3-nitro-phenylfurylketone | do | Red. |
| 4-aminophenylfurylketone | m-Methyl-di-β-hydroxyethylaniline | Orange. |
| 4-amino-3-chlorophenylfurylketone | do | Orange-red. |
| 4-amino-3-bromophenylfurylketone | do | Do. |
| 4-amino-3-nitrophenylfurylketone | do | Red. |
| 4-aminophenylfurylketone | β-Hydroxyethylaniline | Orange. |
| 4-amino-3-chlorophenylfurylketone | do | Orange-red. |
| 4-amino-3-bromophenylfurylketone | do | Do. |
| 4-amino-3-nitrophenylfurylketone | do | Red. |
| 4-amino-3-nitrophenylfurylketone | Butyl-glyceryl m-toluidine | Do. |
| 4-amino-3-bromophenylfurylketone | do | Do. |
| 4-amino-3-chlorophenylfurylketone | do | Do. |
| 4-aminophenylfurylketone | do | Orange. |
| Do | β-Hydroxyethyl-α-naphthylamine | Red. |
| 4-amino-3-chlorophenylfurylketone | do | Purplish-red. |
| 4-amino-3-bromophenylfurylketone | do | Do. |
| 4-amino-3-nitrophenylfurylketone | do | Do. |
| 4-aminophenylfurylketone | Di-β-Hydroxyethyl-α-naphthylamine | Red. |
| 4-amino-3-chlorophenylfurylketone | do | Purplish-red. |
| 4-amino-3-bromophenylfurylketone | do | Do. |
| 4-amino-3-nitrophenylfurylketone | do | Do. |
| [structure: furan-C(=O)-C6H4-NH2] | Barbituric acid | Greenish-yellow. |
| Do | 5,5-dimethyl-1,3-cyclohexadione | Do. |
| Do | Ethyl-β-hydroxyethylaniline | Orange. |
| Do | β-Hydroxyethyl-cresidine | Do. |
| Do | β-Hydroxyethyl-α-naphthylamine | Red. |
| [structure: pyrrole-C(=O)-C6H4-NH2] | Barbituric acid | Greenish-yellow. |
| Do | 5,5-dimethyl-1,3-cyclohexadione | Do. |
| Do | Ethyl-β-hydroxyethylaniline | Orange. |
| Do | β-Hydroxyethyl-m-toluidine | Do. |
| [structure: dihydrofuran-C(=O)-C6H4-NH2] | β-Hydroxyethylaniline | Do. |
| Do | Ethyl-β-hydroxyethylaniline | Do. |
| 4-amino-3-methylphenylfurylketone | 5,5-dimethyl-1,3-cyclohexadione | Greenish-yellow. |
| Do | Barbituric acid | Do. |
| Do | Thiobarbituric acid | Do. |
| Do | β-Hydroxyethyl m-anisidine | Orange. |
| 4-amino-3-methoxyphenylfurylketone | 5,5-dimethyl-1,3-cyclohexadione | Greenish-yellow. |
| Do | Barbituric acid | Do. |
| Do | Thiobarbituric acid | Do. |
| Do | β-Hydroxyethylaniline | Orange. |
| 4-amino-3-chloro-5-nitrophenylfurylketone | Barbituric acid | Greenish-yellow. |
| Do | β-Hydroxyethylaniline | Orange. |
| 4-amino-3-methyl-5-chlorophenylfurylketone | 5,5-dimethyl-1,3-cyclohexadione | Greenish-yellow. |
| Do | Ethyl-β-hydroxyethylaniline | Orange. |
| [structure: pyrrole-C(=O)-C6H4-NH2 with NO2] | Dimethylaniline | Red. |
| Do | β-Hydroxyethylaniline | Orange. |
| Do | 1,3-cyclohexadione | Orange-yellow. |
| Do | 1-phenyl-3-methyl-5-pyrazolone | Do. |
| [structure: thiophene-C(=O)-C6H4(Cl)-NH2] | β-Hydroxyethyl-m-toluidine | Red. |
| Do | Barbituric acid | Greenish-yellow. |
| Do | 5,5-dimethyl-1,3-cyclohexadione | Do. |

| Amine | Coupling component | Color on cellulose acetate silk |
|---|---|---|
| 4-aminophenylfurylketone | 1-phenyl-3-methyl-5-pyrazolone | Orange-yellow. |
| Do | 1,3-cyclohexadione | Do. |
| 4-amino-3-ethylphenylfurylketone | Ethyl-β-hydroxyethylaniline | Orange. |
| 4-amino-3-ethoxyphenylfurylketone | Di-β-hydroxyethylaniline | Do. |
| 4-amino-3-chloro-5-methylphenylfurylketone | do | Orange-red. |
| 4-amino-3,5-dinitrophenylfurylketone | β-Hydroxyethylaniline | Rubine. |
| [structure: CH₃-C(HC=CH)S-C(=O)-C₆H₄-NH₂] | [structure: methoxy-methyl-N(CH₂CH₂OH)₂ benzene] | Orange-red. |
| Do | [structure: dimethoxy-N(CH₂CH₂OH)₂ benzene] | Do. |
| [structure: CH₃-C(HC=CH)O-C(=O)-C₆H₄-NH₂] | Dimethylaniline | Orange. |
| Do | Barbituric acid | Greenish-yellow. |
| Do | Ethyl-β-hydroxyethylaniline | Orange. |

In order that the application of the compounds of our invention may be clearly understood their application for the direct dyeing or coloration of materials made of or containing an organic derivative of cellulose, and more particularly cellulose acetate silk, is described hereinafter. Although the remarks are more particularly directed to the dyeing or coloring of the above mentioned materials those pertaining to temperature, the dispersing agents and the amounts of dispersing agent and dye which may be employed, for example, are of general applicability where the dye is to be applied directly to the fiber from an aqueous suspension. The general methods by which the dye compounds may be applied to the coloration of other materials are well known in the art and need not be described here.

In employing the azo compounds of our invention as dyes, they will ordinarily be applied to the material in the form of an aqueous suspension which can be prepared by grinding the dye to a paste in the presence of a sulfonated oil, soap or other suitable dispersing agent and dispersing the resulting paste in water. Dyeing operations can, with advantage be conducted at a temperature of 80-85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45-55° C., for example, following which the temperature of the dyebath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to effect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, the sulfonated oleic, stearic or palmitic acid, or salts thereof, such, for example, as the sodium or ammonium salts.

While it is preferred to effect coloration by applying the dye compound from an aqueous dyebath to the material to be colored, the azo compounds of our invention may be applied employing the methods applicable to the so called ice colors. Briefly, in accordance with this method of dyeing the amine is absorbed and diazotized on the fibre after which the dye is formed in situ by developing with a coupling component such as 5-methyl-1,3-cyclohexadione or ethyl-β-hydroxyethylaniline, for example. The following examples illustrate how dyeing may be carried out in accordance with our invention. Quantitiees are expressed in parts by weight.

*Example A*

2.5 parts of

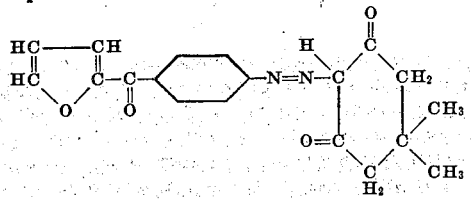

are fineley ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk in the form of yarn or fabric, for example, are added to the dyebath after which the temperature is gradually raised to 80–85° C. and the silk worked for several hours at this latter temperature. Sodium chloride may be added if desired during the dyeing operation to promote exhaustion of the dyebath. Upon completion of the dyeing operation, the cellulose acetate silk is removed, washed with soap, rinsed, and dried. The cellulose acetate silk is colored a greenish yellow shade of good fastness to light.

*Example B*

By the substitution of 2.5 parts of

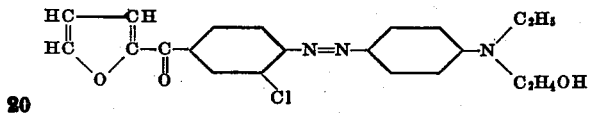

for the dye compound of Example A, cellulose acetate silk can be dyed a reddish shade of good fastness to light in an exactly similar manner as described in said example.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the examples or by substitution of both the material being dyed and the dye compounds of the examples.

The expression "a phenyl nucleus" appearing in certain of the claims refers to a phenyl nucleus containing but one benzene ring. This phenyl nucleus may be substituted, for example, with an alkyl group, an alkoxy group, a halogen atom or a nitro group.

We claim:

1. Azo dye compounds having the general formula:

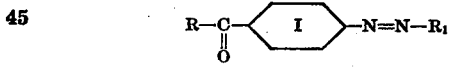

wherein R represents a heterocyclic nucleus selected from the group consisting of a furan, a thiophene and a pyrrol radical, $R_1$ represents a member selected from the group consisting of a benzene nucleus, a naphthalene nucleus, a heterocyclic nucleus and a hydroaromatic nucleus and wherein the nucleus designated I may contain a member selected from the group consisting of an alkyl group, an alkoxy group, a halogen atom and a nitro group.

2. Azo dye compounds having the general formula:

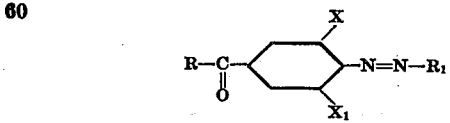

wherein R represents a heterocyclic nucleus selected from the group consisting of a furan, a thiophene and a pyrrol radical, X and $X_1$ each represent a member selected from the group consisting of hydrogen, an alkyl group, an alkoxy group, a nitro group and a halogen atom and $R_1$ represents a member selected from the group consisting of a benzene nucleus, a naphthalene nucleus, a heterocyclic nucleus and a hydroaromatic nucleus.

3. Azo dye compounds having the general formula:

wherein R represents a heterocyclic nucleus selected from the group consisting of a furan, a thiophene and a pyrrol radical, $R_1$ represents an aryl nucleus of the benzene series and wherein the nucleus designated I may contain a member selected from the group consisting of an alkyl group, an alkoxy group, a halogen atom and a nitro group.

4. Azo dye compounds having the general formula:

wherein R represents a furan radical, $R_1$ represents an aryl nucleus of the benzene series and wherein the nucleus designated I may contain a member selected from the group consisting of an alkyl group, an alkoxy group, a halogen atom and a nitro group.

5. Azo dye compounds having the general formula:

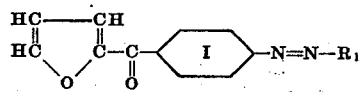

wherein $R_1$ represents an aryl nucleus of the benzene series and wherein the nucleus designated I may contain a member selected from the group consisting of an alkyl group, an alkoxy group, a halogen atom and a nitro group.

6. Azo dye compounds having the general formula:

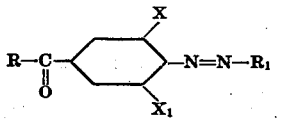

wherein R represents a heterocyclic nucleus selected from the group consisting of a furan, a thiophene and a pyrrol radical, X and $X_1$ each represent a member selected from the group consisting of hydrogen, an alkyl group, an alkoxy group, a nitro group and a halogen atom and $R_1$ represents an aryl nucleus of the benzene series.

7. Azo dye compounds having the general formula:

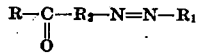

wherein R represents a heterocyclic nucleus selected from the group consisting of a furan, a thiophene and a pyrrol radical, $R_2$ represents a phenyl nucleus and $R_1$ represents a member selected from the group consisting of a benzene nucleus, a naphthalene nucleus, a heterocyclic nucleus and a hydroaromatic nucleus.

8. Azo dye compounds having the general formula:

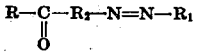

wherein R represents a heterocyclic nucleus selected from the group consisting of a furan, a thiophene and a pyrrol radical, $R_2$ represents a phenyl nucleus and $R_1$ represents an aryl nucleus of the benzene series.

9. The azo dye compound having the formula:

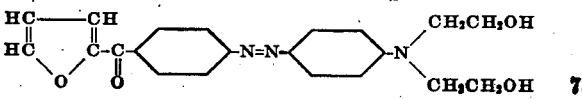

10. The process of coloring material made of or containing an organic derivative of cellulose which comprises applying thereto a nuclear nonsulfonated azo dye, having affinity for organic derivatives of cellulose, selected from the azo dye compounds having the general formula:

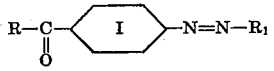

wherein R represents a heterocyclic nucleus selected from the group consisting of a furan, a thiophene and a pyrrol radical, $R_1$ represents a member selected from the group consisting of a benzene nucleus, a naphthalene nucleus, a heterocyclic nucleus and a hydroaromatic nucleus and wherein the nucleus designated I may contain a member selected from the group consisting of an alkyl group, an alkoxy group, a halogen atom and a nitro group.

11. The process of coloring material made of or containing an organic derivative of cellulose which comprises applying thereto a nuclear nonsulfonated azo dye, having affinity for organic derivatives of cellulose, selected from the azo dye compounds having the general formula:

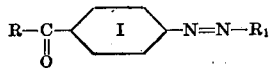

wherein R represents a heterocyclic nucleus selected from the group consisting of a furan, a thiophene and a pyrrol radical, $R_1$ represents an aryl nucleus of the benzene series and wherein the nucleus designated I may contain a member selected from the group consisting of an alkyl group, an alkoxy group, a halogen atom and a nitro group.

12. The process of coloring material made of or containing an organic acid ester of cellulose which comprises applying thereto a nuclear nonsulfonated azo dye, having affinity for organic acid esters of cellulose, selected from the azo dye compounds having the general formula:

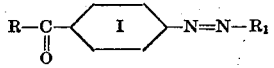

wherein R represents a heterocyclic nucleus selected from the group consisting of a furan, a thiophene and a pyrrol radical, $R_1$ represents an aryl nucleus of the benzene series and wherein the nucleus designated I may contain a member selected from the group consisting of an alkyl group, an alkoxy group, a halogen atom and a nitro group.

13. The process of coloring a cellulose acetate which comprises applying thereto a nuclear nonsulfonated azo dye, having affinity for a cellulose acetate, selected from the azo dye compounds having the general formula:

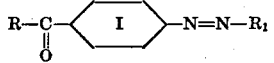

wherein R represents a heterocyclic nucleus selected from the group consisting of a furan, a thiophene and a pyrrol radical, $R_1$ represents a member selected from the group consisting of a benzene nucleus, a naphthalene nucleus, a heterocyclic nucleus and a hydroaromatic nucleus and wherein the nucleus designated I may contain a member selected from the group consisting of an alkyl group, an alkoxy group, a halogen atom and a nitro group.

14. The process of coloring a cellulose acetate which comprises applying thereto a nuclear nonsulfonated azo dye, having affinity for a cellulose acetate, selected from the azo dye compounds having the general formula:

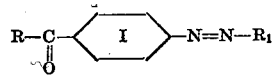

wherein R represents a heterocyclic nucleus selected from the group consisting of a furan, a thiophene and a pyrrol radical, $R_1$ represents an aryl nucleus of the benzene series and wherein the nucleus designated I may contain a member selected from the group consisting of an alkyl group, an alkoxy group, a halogen atom and a nitro group.

15. The process of coloring a cellulose acetate which comprises applying thereto a nuclear nonsulfonated azo dye, having affinity for a cellulose acetate, selected from the azo dye compounds having the general formula:

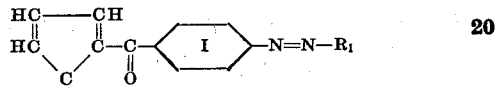

wherein $R_1$ represents an aryl nucleus of the benzene series and wherein the nucleus designated I may contain a member selected from the group consisting of an alkyl group, an alkoxy group, a halogen atom and a nitro group.

16. The process of coloring a cellulose acetate which comprises applying thereto a nuclear nonsulfonated azo dye, having affinity for a cellulose acetate, selected from the azo dye compounds having the general formula:

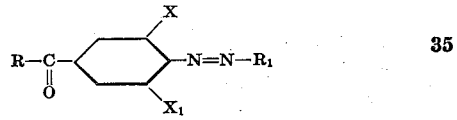

wherein R represents a heterocyclic nucleus selected from the group consisting of a furan, a thiophene and a pyrrol radical, X and $X_1$ each represent a member selected from the group consisting of hydrogen, an alkyl group, an alkoxy group, a nitro group and a halogen atom and $R_1$ represents an aryl nucleus of the benzene series.

17. Azo dye compounds having the general formula:

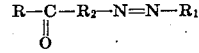

wherein R represents a heterocyclic nucleus selected from the group consisting of a furan, a thiophene and a pyrrol radical, $R_2$ represents a phenyl nucleus, $R_1$ represents an aryl nucleus of the benzene series and wherein the group

is attached to the phenyl nucleus $R_2$ in para position to the azo bond.

18. Azo dye compounds having the general formula:

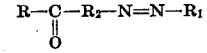

wherein R represents a furan radical, $R_2$ represents a phenyl nucleus, $R_1$ represents an aryl nucleus of the benzene series and wherein the group

is attached to the phenyl nucleus $R_2$ in para position to the azo bond.

JAMES G. McNALLY.
JOSEPH B. DICKEY.
WERNER H. ZUGSCHWERDT.